United States Patent
Ramirez et al.

(10) Patent No.: US 12,505,238 B2
(45) Date of Patent: Dec. 23, 2025

(54) OBJECT ALTERATION IN IMAGE

(71) Applicant: Lenovo (United States) Inc., Morrisville, NC (US)

(72) Inventors: Axel Ramirez, Cary, NC (US); Russell Speight VanBlon, Raleigh, NC (US); Rodrigo Almeida, Raleigh, NC (US); Rod D Waltermann, Rougemont, NC (US)

(73) Assignee: Lenovo (United States) Inc., Morrisville, NC (US)

( * ) Notice: Subject to any disclaimer, the term of this patent is extended or adjusted under 35 U.S.C. 154(b) by 217 days.

(21) Appl. No.: 17/490,722

(22) Filed: Sep. 30, 2021

(65) Prior Publication Data

US 2023/0095955 A1   Mar. 30, 2023

(51) Int. Cl.
*G06F 21/62* (2013.01)
*H04N 1/44* (2006.01)

(52) U.S. Cl.
CPC ......... *G06F 21/6209* (2013.01); *H04N 1/448* (2013.01)

(58) Field of Classification Search
CPC .................. G06F 21/6209; H04N 1/448
See application file for complete search history.

(56) References Cited

U.S. PATENT DOCUMENTS

| | | | | |
|---|---|---|---|---|
| 2006/0170669 | A1* | 8/2006 | Walker | H04N 1/00352 715/255 |
| 2008/0181533 | A1* | 7/2008 | Jung | G11B 27/034 382/283 |
| 2011/0037777 | A1* | 2/2011 | Lindahl | G06F 1/1626 715/810 |
| 2011/0298799 | A1* | 12/2011 | Mariani | G06V 10/7553 345/420 |
| 2016/0307063 | A1* | 10/2016 | Bright | G06V 30/153 |
| 2019/0068895 | A1* | 2/2019 | Hutz | G06V 10/82 |
| 2022/0343573 | A1* | 10/2022 | Harada | G06T 11/60 |
| 2023/0368629 | A1* | 11/2023 | Fekete | H04N 7/188 |

* cited by examiner

*Primary Examiner* — Vance M Little
(74) *Attorney, Agent, or Firm* — FERENCE & ASSOCIATES LLC (57) ABSTRACT

One embodiment provides a method, including: receiving, at a privacy system, an image comprising an object; determining, using a processor, whether an alteration rule for presentation of the object is applicable to the image; and transmitting, responsive to determining that the alteration rule is applicable to the image, an indication to at least one image-display destination of an alteration to the object based on the alteration rule. Other aspects are described and claimed.

17 Claims, 5 Drawing Sheets

OBJECT ALTERATION IN IMAGE

BACKGROUND

Individuals frequently capture images (e.g., static images such as pictures, dynamic images such as videos, etc.) of themselves or other objects using their information handling devices ("devices"), for example, smart phones, tablet devices, laptop and/or personal computers, and the like. These live or recorded images may then be transmitted to various different types of image display sources (e.g., websites, social media applications, other user devices, etc.).

BRIEF SUMMARY

In summary, one aspect provides a method, including: receiving, at a privacy system, an image comprising an object; determining, using a processor, whether an alteration rule for presentation of the object is applicable to the image; and transmitting, responsive to determining that the alteration rule is applicable to the image, an indication to at least one image-display destination of an alteration to the object based on the alteration rule.

Another aspect provides an information handling device, including: a processor; a memory device that stores instructions executable by the processor to: receive, at a privacy system, an image comprising an object; determine whether an alteration rule for presentation of the object is applicable to the image; and transmit, responsive to determining that the alteration rule is applicable to the image, an indication to at least one image-display destination of an alteration to the object based on the alteration rule.

A further aspect provides a product, including: a storage device that stores code, the code being executable by a processor and comprising: code that receives an image comprising an object; code that determines whether an alteration rule for presentation of the object is applicable to the image; and code that transmits, responsive to determining that the alteration rule is applicable to the image, an indication to at least one image-display destination of an alteration to the object based on the alteration rule.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 4(A-B) provides an example illustration of a replacement alteration mode according to an embodiment.

FIG. 5(A-B) provides an example illustration a see-through alteration mode according to an embodiment.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Individuals have an interest in controlling how images of themselves, or other objects-of-interest, are presented or reproduced. More particularly, individuals may not want to appear in certain photos or, alternatively, may desire to have their likeness in the photo modified or replaced with another individual or object. Currently, users do not have a choice to select what and if a camera should be allowed to show or remove a specific person or object from a captured scene.

Conventional solutions provide some privacy protection for an individual with respect to their captured and/or broadcast media. For instance, software tools exist that may be capable of adding pixel-level perturbations to images, which effectively prevent facial recognition systems from identifying the individual in a photo or video. Although effective for newer images, this software is unable to prevent systems that have already been trained on individuals' unprotected images from recognizing the individual. Additional image altering solutions exist, but these additional solutions require manual image editing by a user, which may be time-consuming and/or burdensome to implement.

Accordingly, an embodiment provides a method for dynamically altering one or more objects in an image based upon user-designated privacy rules. In an embodiment, an image containing an object (e.g., a person, an object-of-interest, etc.) may be received at a privacy system (e.g., resident or server, etc.). An embodiment may then determine whether an alteration rule exists for the object. Alteration rules may specify which objects in an image should be altered, which situations necessitate object alteration, and/or how these objects should be altered (e.g., removed from the image entirely, replaced with another object, etc.). Responsive to determining that an alteration rule does exist, an embodiment may transmit an indication to at least one image-display source (e.g., a website, an application, a device, etc.) that will display the image of an alteration that should be made to the object. Such a method may ensure that the user's privacy settings are honored on the privacy platform and across a supported ecosystem of applications.

The illustrated example embodiments will be best understood by reference to the figures. The following description is intended only by way of example, and simply illustrates certain example embodiments.

Figure 1:
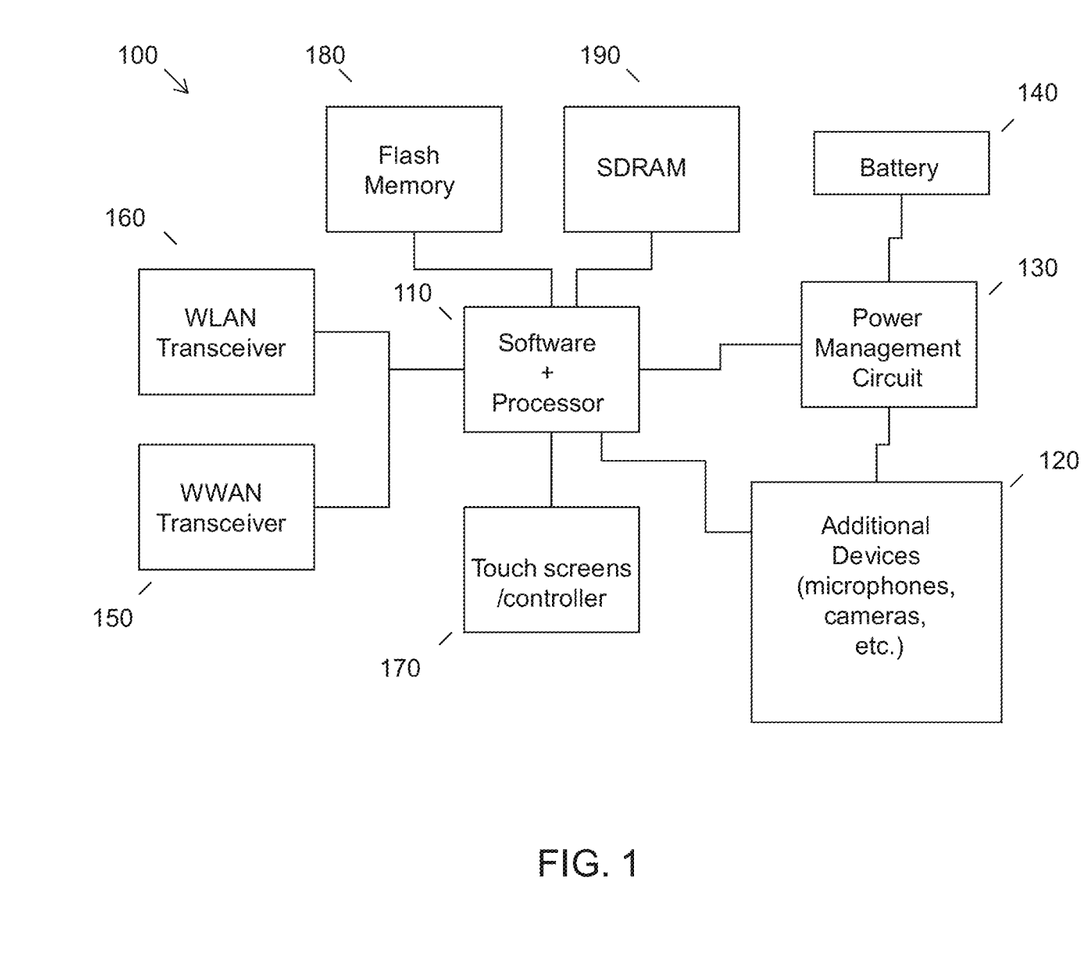
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, etc. System 100 often includes one or more touch screens 170 for data input and display/rendering. System 100 also typically includes various memory devices, for example flash memory 180 and SDRAM 190.

Figure 2:
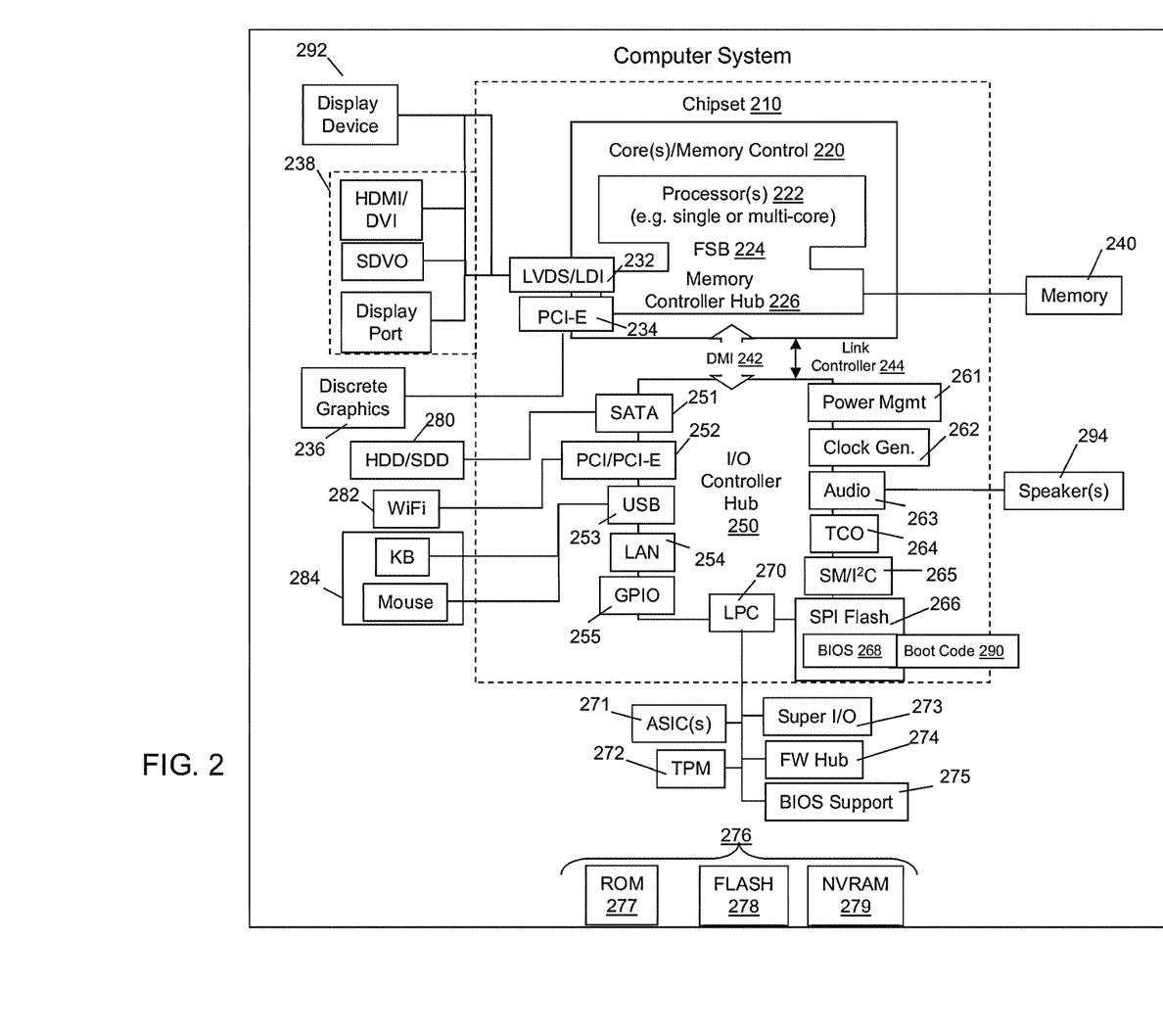
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, NC, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling circuitry, as for example outlined in FIG. 1 or FIG. 2, may be used in computing devices capable of capturing and/or receiving live or recorded images. For example, the circuitry outlined in FIG. 1 may be implemented in a smart phone operatively coupled to a vehicle, whereas the circuitry outlined in FIG. 2 may be implemented into a computer.

Figure 3:
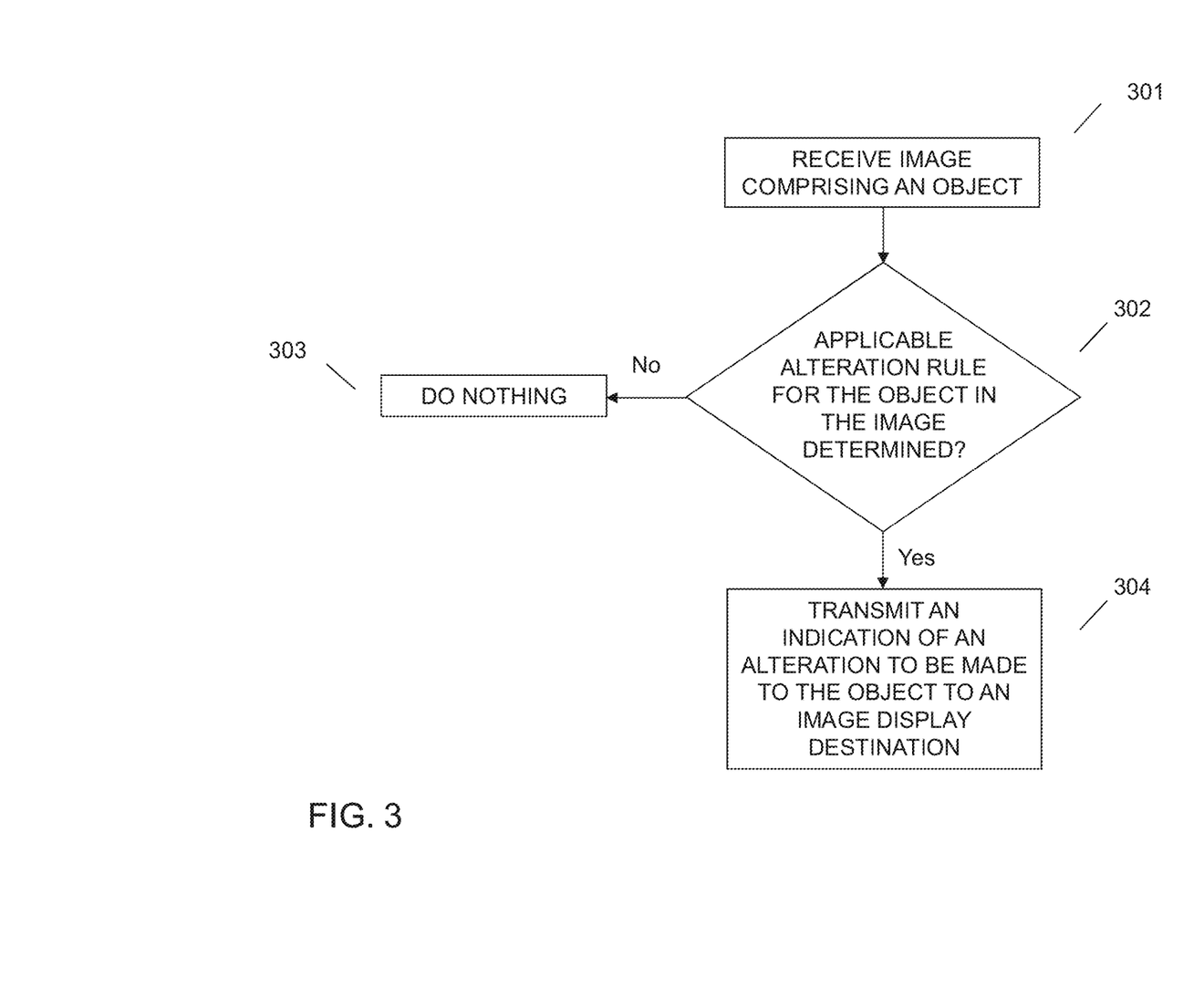
FIG. 3 illustrates an example method of altering an object in an image.

Referring now to FIG. 3, an embodiment provides a method of implementing an alteration to an object in an image based upon an alteration rule designated by a user. At 301, an embodiment may receive an image comprising an object. In the context of this application, an image may refer to a static image (e.g., a picture, etc.) or a dynamic image (e.g., a video, etc.). Additionally, the image may be a live image (i.e., one received from a live camera feed) or a recorded image (i.e., a previously captured and stored image). In an embodiment, the object may be virtually any type of user-designated object. For example, the object in the image may be the user, another person, an animal (e.g., a pet, etc.), or another object-of-interest (e.g., a vehicle, a tree, a logo, etc.).

In an embodiment, the image may be received at a privacy system. The privacy system may be resident on a user's device, on an application running on the user's device, or on a remote server that is accessible to the user's device. The privacy system may be enabled to make changes to the image prior to the image being transmitted to and/or displayed at an end location, such as an image display destination (e.g., a website, a social media application, on the user's device, on another users' device, etc.).

In an embodiment, the privacy system may contain a user interface that enables a user to establish their desired privacy settings with respect to how an object is presented in an image. More particularly, an individual may interact with the user interface to create one or more alteration rules. These rules may provide direction to the privacy system regarding: which objects a user wants altered, which situations does the user want the objects altered in response to, and exactly how does the user want the objects altered. In an embodiment, the alteration rules may vary between individuals. More particularly, multiple users may access and use a single device. In such a situation, an embodiment may identify the alteration rules that correspond to the relevant user by identifying a currently active user profile. Specifically, each user profile may contain unique alteration rules that an individual associated with that user profile has established.

As previously mentioned, the alteration rules may dictate various aspects of image presentation. In an embodiment, one of those aspects corresponds to the specific object(s) a user wants altered. In this regard, an individual may specify, at the privacy system user interface, the object type(s) that should be monitored for to undergo alteration (e.g., specific people, pets, objects, etc.). As a non-limiting example, a user may designate that they want any presence of their likeness in an image to be altered (as further described herein). As another non-limiting example, one or more copyright owners may designate that they want any presence of a copyrighted work (e.g., logo, artwork, other type of copyrighted object, etc.) in an image to be altered. In yet another non-limiting example, one or more parents may designate that any presence of their children in an image (e.g., a class photo, etc.) should be altered.

In an embodiment, another aspect of an alteration rule corresponds to the situation or situations that an object in an image should be altered in response to. More particularly, a user may want one or more objects in an image to be altered responsive to detecting that specific criteria associated with the image are present. Relevant criteria include a location that the image was captured, the identity of the individual capturing the image, an event that the image was captured for, and the like. As a non-limiting example of the foregoing, a user may designate that they want their likeness altered in all images taken at a particular party. In another non-limiting example, a user may designate that they want their likeness altered in all images taken and/or posted by a particular individual.

In an embodiment, yet another aspect of an alteration rule corresponds to the way the user wants an object to be altered. More particularly, available alterations selectable by a user may include replacement alterations or see-through alterations. Regarding replacement alterations, a user may elect to replace all, or a portion of, the object of interest with another object. For instance, in the situation where the designated object to be replaced is the face of the user, the user may designate that their face be replaced with another face (e.g., corresponding to another individual such as a celebrity or a television/movie character) or another object (e.g., a helmet, etc.). As another example, in the situation where the designated object to be replaced is the entire likeness of the user, an embodiment may replace the user's entire presence in the photo with another person or object. In an embodiment, the user may select (i.e., from the user interface) which objects will be used for the replacement. Alternatively, an embodiment may dynamically select the replacement objects itself. More particularly, an embodiment may analyze an image to determine its context and thereafter choose a replacement object that is consistent with that context (e.g., an object in a beach scene may be replaced with a beach-themed object, etc.).

Figure 4A:
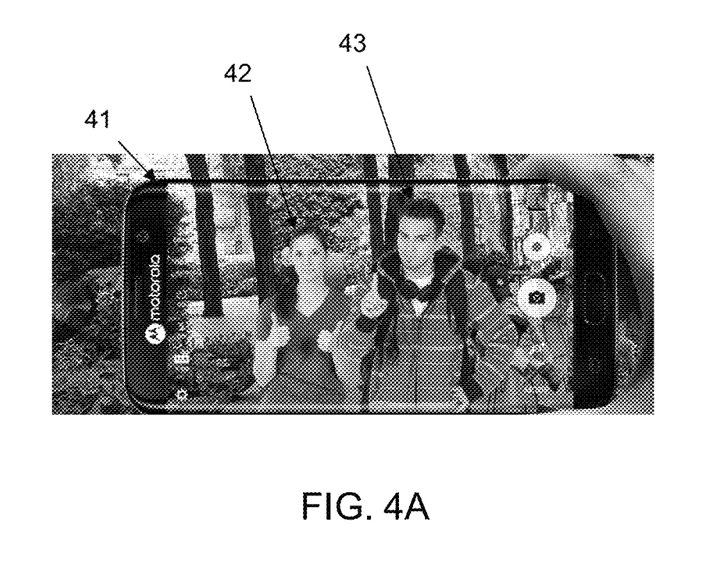
Figure 4B:
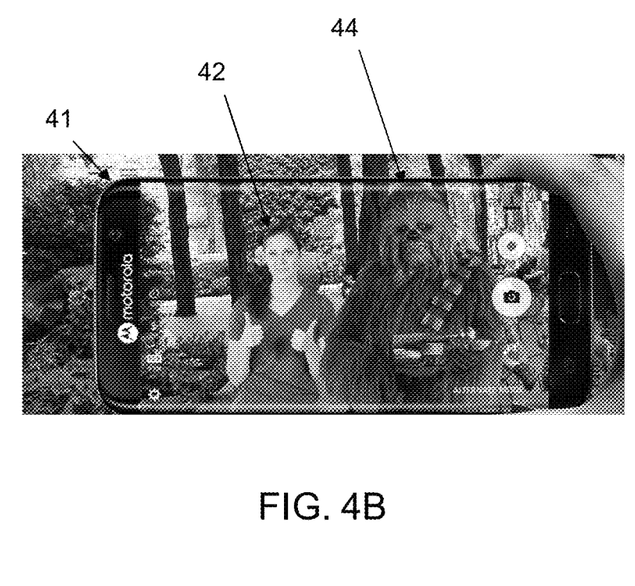

Turning now to FIG. 4(A-B), a non-limiting example of the replacement alteration process is illustrated. At FIG. 4A, a user of a device 41 may preview an image of a scene prior to capturing it. The scene may include a first individual 42 and a second individual 43. The user may toggle settings that activate an alteration mode for the image preview. In this mode, an alteration rule may exist in the ruleset that specifies that each instance of the second individual 43 in an image must be replaced with a movie character 44. Accordingly, in FIG. 4B the second individual 43 is removed from the scene and replaced with the movie character 44.

Regarding see-through alterations, a user may elect to have the entirety of the object removed from the image. In such a situation, any background material originally obscured by the presence of the object may be visible. If no background material exists behind the removed object, or an embodiment is unable to determine the background material behind the removed object, an embodiment may simply fill that space in on the image with a stock image or color. Additionally or alternatively, an embodiment may attempt to fill the background with objects that may match the surrounding context of the image (e.g., an embodiment may attempt to include images of trees for a photo taken in a forest, etc.).

Figure 5A:
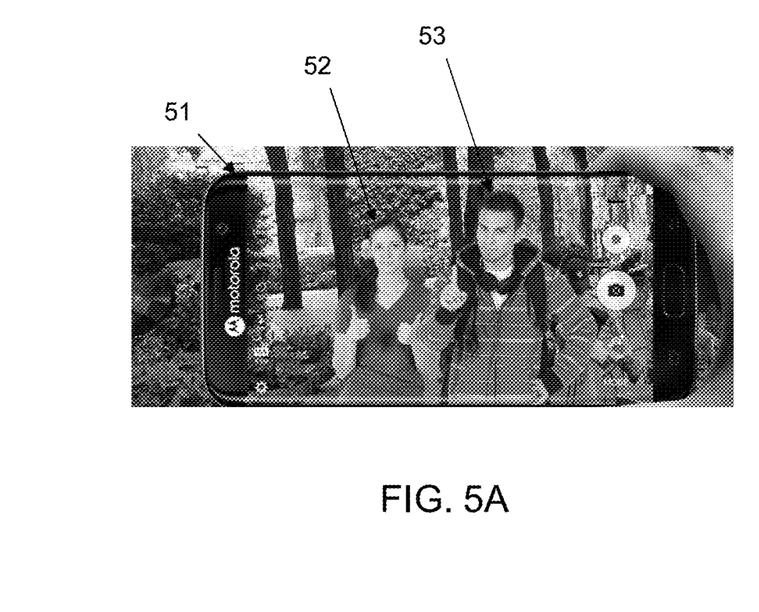
Figure 5B:
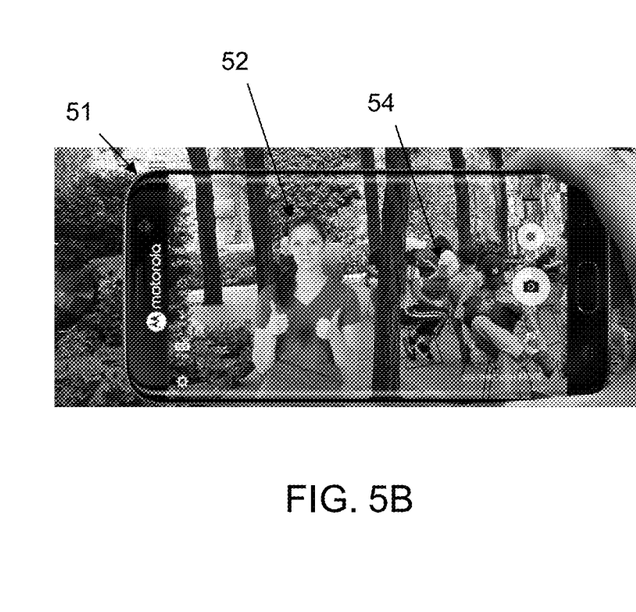

Turning now to FIG. 5(A-B), a non-limiting example of the see-through alteration process is illustrated. At FIG. 5A, a user of a device 51 may preview an image of a scene prior to capturing it. The scene may include a first individual 52 and a second individual 53. The user may toggle settings that activate a see-through mode for the image preview. In this mode, an alteration rule may exist in the ruleset that specifies that each instance of the second individual 53 in an image must be removed from the image. Accordingly, in FIG. 5B the second individual 53 is completely removed from the scene, enabling background objects 54 to become visible.

At 302, an embodiment may determine whether an alteration rule for presentation of the object exists. This determination may be facilitated by first accessing a ruleset (e.g., stored in an accessible location by the privacy system, etc.) that identifies the existing alteration rules. An embodiment may then analyze the contents of the received image (e.g., using one or more conventional image analysis techniques known in the art, etc.) and/or data associated with the received image (e.g., data associated with the location where the image was captured, data associated with the identity of an individual capturing the image, data associated with where the image is being displayed, other types of attached data or metadata, etc.) to determine whether a specific alteration rule applies (e.g., by comparing the analysis results to the alteration rules in the ruleset.

Responsive to determining, at 302, that an alteration rule is not applicable to the current image, an embodiment may, at 303, take no additional action. More particularly, an embodiment may simply allow the received image to be transmitted unaltered to an image display destination. Conversely, responsive to determining, at 302, that an alteration rule is applicable to the current image, an embodiment may, at 304, transmit an indication of an alteration to be made to the object to an image display destination.

In an embodiment, the transmission of the indication may occur automatically without the receipt of any additional user input. Additionally or alternatively, an embodiment may query a user (e.g., by providing a notification to the user on their device, etc.) to confirm that they actually do want an object altered prior to transmitting the indication to the image display destination. Only when confirmation is received from the user does the privacy system transmit the indication to alter. If confirmation is not received, an embodiment may take no alteration action on the object. In an embodiment, the object may be altered in a variety of different ways as discussed above (e.g., a replacement alteration may be implemented, a see-through alteration may be implemented, etc.).

Individuals may not want any posted or displayed media containing indications of their identity to be reverse searched. Accordingly, an embodiment may anonymize data and/or metadata associated with displayed images. The anonymization may be facilitated utilizing one or more conventional differential privacy techniques known in the art that may be applied by the privacy system. With this process, individuals may benefit from the peace of mind of not having images be reverse searched because the image displayed at the image display destination differs from the characteristics of the real end user.

Additional examples of use-cases are provided below that illustrate how the inventive concepts described herein may be leveraged in unique and meaningful ways. It is important to note that these use-cases are not exhaustive and that these may be applicable to many other situations not explicitly described here.

In one use case, the privacy system may be leveraged to remove any indication of a user's presence from photos taken at an event. In another use case, the privacy system may be leveraged to replace all instances of a user's presence in images with an alternative individual (e.g., a famous movie character, etc.). In another use case, the privacy system may be leveraged to remove an unsightly or undesirable object (e.g., a rusted car, an alcohol bottle, an offensive object, etc.) from a scene or recording. In another use case, the privacy system may be leveraged by a teacher to automatically remove any children's faces in a classroom picture that did not receive permission to take part in the picture from their parents. In another use case, the privacy system may be leveraged to preview how the removal of a specific object may affect the aesthetic appearance of a scene. In another use case, the privacy system may be leveraged to enforce the rights of one or more copyright owners that don't want their copyrighted works appearing in unauthorized images. In another use case, additional hardware components may be utilized to originally encrypt a high resolution photo and thereafter only decrypt it from the Trusted Platform Module ("TPM") when the appropriate permissions are granted, meanwhile displaying a low resolution photo.

The various embodiments described herein thus represent a technical improvement to conventional methods for protecting an individual's privacy in captured media and/or shared media. Using the techniques described herein, an embodiment may receive an image comprising an object at a privacy system. An embodiment may then determine whether one or more alteration rules are applicable to the image based on the object. Responsive to determining that at least one alteration rule is applicable to the image, an embodiment may transmit an indication of an alteration rule corresponding to the object to one or more image display destinations. Such a method may ensure that a user's privacy preferences are honored.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying

What is claimed is:

1. A method, comprising:

receiving, at a privacy system, an image comprising an object;

determining, using a processor, that an alteration rule for presentation of the object is applicable to the image, wherein the determining comprises accessing a ruleset that governs presentation of the object in the image, wherein the ruleset comprises a plurality of alteration rules identifying objects to be altered, situations in which the objects are to be altered, and how the objects are to be altered based upon the situations, wherein the alteration rule is based upon criteria present within the image and is based upon a user associated with the image; and transmitting, responsive to determining that the alteration rule is applicable to the image, an indication to at least one image-display destination of an alteration to the object based on the alteration rule, wherein the transmitting comprises capturing the image with the alteration to the object, wherein the capturing the image comprises anonymizing, using a differential privacy process, metadata associated with the captured image wherein the anonymizing the metadata prevents the image with the alteration to the object from being reverse searched.

2. The method of claim 1, wherein the receiving comprises receiving the image from one of: a live camera feed or a recorded camera feed.

3. The method of claim 1, further comprising displaying, on the at least one image-display destination, the image with the alteration to the object.

4. The method of claim 3, wherein the alteration is a replacement alteration and wherein the displaying comprises replacing the object in the image with another object.

5. The method of claim 3, wherein the alteration is a see-through alteration and wherein the displaying comprises removing the object from the image.

6. The method of claim 1, wherein the plurality of alteration rules contained within the ruleset are based upon a currently active user profile.

7. The method of claim 1, wherein the privacy system comprises a user interface containing one or more alteration rule designation options.

8. The method of claim 1, wherein the image-display destination is selected from the group consisting of: an application, a browser window, and another information handling device.

9. An information handling device, comprising:

a processor;

a memory device that stores instructions executable by the processor to:

receive, at a privacy system, an image comprising an object;

determine that an alteration rule for presentation of the object is applicable to the image, wherein the determining comprises accessing a ruleset that governs presentation of the object in the image, wherein the ruleset comprises a plurality of alteration rules identifying objects to be altered, situations in which the objects are to be altered, and how the objects are to be altered based upon the situations, wherein the alteration rule is based upon criteria present within the image and is based upon a user associated with the image; and transmit, responsive to determining that the alteration rule is applicable to the image, an indication to at least one image-display destination of an alteration to the object based on the alteration rule, wherein the transmitting comprises capturing the image with the alteration to the object wherein the capturing the image comprises anonymizing, using a differential privacy process, metadata associated with the captured image and wherein the anonymizing the metadata prevents the image with the alteration to the object from being reverse searched.

10. The information handling device of claim 9, wherein the image is one of: a live-image or a recorded image.

11. The information handling device of claim 9, wherein the instructions are further executable by the processor to display, on the at least one image-display destination, the image with the alteration to the object.

12. The information handling device of claim 11, wherein the alteration is a replacement alteration and wherein the displaying comprises replacing the object in the image with another object.

13. The information handling device of claim 11, wherein the alteration is a see-through alteration and wherein the displaying comprises removing the object from the image.

14. The information handling device of claim 9, wherein the plurality of alteration rules contained within the ruleset are based upon a currently active user profile.

15. The information handling device of claim 9, wherein the privacy system comprises a user interface containing one or more alteration rule designation options.

16. The information handling device of claim 9, wherein the image-display destination is selected from the group consisting of: an application, a browser window, and another information handling device.

17. A product, comprising:

a storage device that stores code, the code being executable by a processor and comprising:

code that receives an image comprising an object;

code that determines that an alteration rule for presentation of the object is applicable to the image, wherein the determining comprises accessing a ruleset that governs presentation of the object in the image, wherein the ruleset comprises a plurality of alteration rules identifying objects to be altered, situations in which the objects are to be altered, and how the objects are to be altered based upon the situations, wherein the alteration rule is based upon criteria present within the image and is based upon a user associated with the image; and code that transmits, responsive to determining that the alteration rule is applicable to the image, an indication to at least one image-display destination of an alteration to the object based on the alteration rule, wherein the transmitting comprises capturing the image with the alteration to the object wherein the capturing the image comprises anonymizing, using a differential privacy process, data associated with the captured image and wherein the anonymizing the metadata prevents the image with the alteration to the object from being reverse searched.

* * * * *